(12) United States Patent
Routhier

(10) Patent No.: US 7,970,276 B1
(45) Date of Patent: Jun. 28, 2011

(54) FRAME STRUCTURE FOR STEREOSCOPIC IMAGING

(75) Inventor: Pierre Hugues Routhier, Varennes (CA)

(73) Assignee: Creat3 Inc., Varennes (CA)

( * ) Notice: Subject to any disclaimer, the term of this patent is extended or adjusted under 35 U.S.C. 154(b) by 0 days.

(21) Appl. No.: 12/758,148

(22) Filed: Apr. 12, 2010

(51) Int. Cl.
 *G03B 35/08* (2006.01)
(52) U.S. Cl. ........................................ 396/325; 396/428
(58) Field of Classification Search .................. 396/309, 396/325
 See application file for complete search history.

(56) References Cited

U.S. PATENT DOCUMENTS

| | | | | | |
|---|---|---|---|---|---|
| 2,153,892 | A | * | 4/1939 | Jackman | 352/133 |
| 2,838,975 | A | * | 6/1958 | Halprin et al. | 396/325 |
| 2,916,962 | A | * | 12/1959 | Spottiswoode et al. | 396/325 |
| 4,557,570 | A | * | 12/1985 | Hines | 396/325 |
| 4,614,943 | A | * | 9/1986 | Boucher | 248/183.2 |
| 4,650,305 | A | * | 3/1987 | Hines | 396/325 |
| 4,957,361 | A | * | 9/1990 | Shaw | 352/59 |
| 5,870,641 | A | * | 2/1999 | Chrosziel | 396/425 |
| 6,149,112 | A | * | 11/2000 | Thieltges | 248/178.1 |
| 6,375,369 | B1 | * | 4/2002 | Schneider et al. | 396/427 |
| 7,899,311 | B1 | * | 3/2011 | Kearney et al. | 396/12 |
| 2004/0048507 | A1 | * | 3/2004 | Hage | 439/332 |

OTHER PUBLICATIONS http://stereotec.com/products.html, "STEREOTEC 3D Live Rig (Carbon)", Website, 2009.
http://www.3dfilmfactory.com/index.php?option=com_content&view=article&id=57:bs-pro-rig&catid=44&Itemid=80, "3D BS PRO Rig", Website, 2009.
P+S Technik, "3D Stereo Rig created by Alain Derobe", User Manual, Apr. 2009.
http://www.technica3d.com/downloads/, "Technica 3D product brochure-OLD", Brochure, Nov. 2009.
http://images.google.ca/imgres?imgurl=http://farm4,static,flickr.com/3518/3762233229__ffdc48dfc8.jpg, "The Hole 3D—RED1 3D Camera Rig and Op", Picture, Jul. 27, 2009.
http://idisk.mac.com/elcuradin/Public/3D_Rig.jpg, Picture.

* cited by examiner

*Primary Examiner* — Clayton E Laballe
*Assistant Examiner* — Leon W Rhodes
(74) *Attorney, Agent, or Firm* — Alexandre Abecassis; Fasken Martineau DuMoulin, LLP

(57) ABSTRACT

There is provided a frame structure for stereoscopic imaging. First and second cameras may be mounted to the structure to respectively record first and second images which may be combined to produce a three-dimensional image. The frame structure comprises a casing sized and shaped to receive a beam splitting device therein and first and second camera supports mounted to a sidewall of the casing for respectively holding the first and second cameras. Each camera support comprises an outer frame defining an internal cavity to receive a corresponding camera therein, and attaching means which comprise at least three connecting portions contacting the casing sidewall and positioned around an opening of the casing sidewall. This configuration substantially prevents deformation of the frame structure due to bending.

20 Claims, 9 Drawing Sheets

FRAME STRUCTURE FOR STEREOSCOPIC IMAGING

CROSS-REFERENCE TO RELATED APPLICATIONS

This application is related to U.S. patent application Ser. No. 12/128,448 entitled MODULAR STEREOSCOPIC RIG, filed on May 28, 2008, the specification of which is incorporated herein by reference.

TECHNICAL FIELD

The invention relates to frame structures for use in imaging. More specifically, the invention pertains to frame structures for stereoscopic imaging.

BACKGROUND

Stereoscopic imaging is an imaging technique in which two cameras are used to record three-dimensional visual information. The first camera records a first image and the second camera records a second image which is slightly different from the first image. The first and second images are then combined to produce a three-dimensional image, i.e. a still three-dimensional image if the two cameras are still photography cameras or a three-dimensional video if the two cameras are video cameras.

To perform this technique, the cameras may be arranged in a setting known as a "beam splitter" setting, which has the advantage of enabling "close-up" shots at a relatively high level of zooming. In this setting, a beam splitting device, such as a half-silvered mirror, is placed at a predetermined angle, usually 45 degrees, in front of a subject. The beam splitting device enables a first portion of incoming light to be transmitted through it and a second portion of incoming light to be reflected on its surface. The first camera is positioned behind the beam splitting device in order to record the first image of the subject through the beam splitting device, while the second camera is placed perpendicularly to the first camera, usually above the beam splitting device, in order to record the second image of the subject reflected on the beam splitting device.

Various apparatuses have been devised to position the cameras relative to the beam splitting device in this setting. Usually, a frame structure is provided to maintain the cameras in position relative to the beam splitting device.

Unfortunately, most of the frame structures of the prior art do not allow the cameras to be properly supported. In some, each camera is mounted on a rail extending perpendicularly between a pair of parallel post members which define a support plane. The camera is therefore supported in a substantially cantilevered configuration by the post members. In this configuration, the weight of the cameras imposes a load on the post members, in a direction perpendicular to a longitudinal axis of the post members. This load may subject the post members to out-of-plane bending relative to the support plane and thereby cause deformations in the post members, especially when the frame structure is moved, for instance to record images of a moving subject.

Since precise positioning of the cameras is required to obtain a desired three-dimensional image, such deformations may require a user to periodically stop recording of the subject to readjust position of the cameras, which is costly and disruptive, and therefore cumbersome. Furthermore, images recorded using cameras mounted on such apparatuses may further require post-production operations to be performed on them in order to correct defects in the recorded images caused by deformations of the frame structure, which is also costly and time-consuming.

Other apparatuses of the prior art comprise a bulky and substantially heavy frame structure which is impractical and cumbersome, especially when the frame structure is moved or transported.

There is therefore a need for a frame structure which would overcome at least one of the above-identified drawbacks.

Features of the invention will be apparent from review of the disclosure, drawings and description of the invention below.

BRIEF SUMMARY

There is provided a frame structure for stereoscopic imaging. The frame structure comprises a casing having a casing sidewall and first and second openings defined on the casing sidewall, the casing being sized and shaped to receive a beam splitting device therein for directing a first portion of an incoming light beam towards the first opening and a second portion of the incoming light beam towards the second opening; a first camera support for holding a first camera and a second camera support for holding a second camera, each of the first and second camera supports comprising an outer frame defining an internal cavity for receiving a corresponding one of the first and second cameras therein, attaching means for connecting the outer frame to the casing sidewall such that the corresponding camera is pointing towards a corresponding one of the first and second openings, the attaching means comprising at least three connecting portions contacting the casing sidewall and positioned around the corresponding opening.

It will be appreciated that by providing at least three connecting portions, or anchoring points, which are spread apart around the corresponding opening, and therefore are not located in a same plane, this configuration substantially eliminates deformations of the corresponding camera support caused by bending, which is of great advantage.

In one embodiment, the at least three connecting portions are interconnected to form a mounting base fastened to the casing sidewall.

In a further embodiment, the mounting base comprises a peripheral frame member having a plurality of elongated side members positioned around the corresponding opening, each elongated side member being connected to an adjacent elongated side member to define a corner portion of the peripheral frame member therebetween.

In yet a further embodiment, the peripheral frame member is rectangular and the plurality of elongated side members comprises four elongated side members.

In another embodiment, the outer frame comprises a plurality of elongated members having a first end and a second end located away from the casing, the plurality of elongated members being parallel to each other and spaced apart to define the cavity therebetween, further wherein each corner portion of the peripheral frame member has an opening defined therein for receiving the first end of a corresponding elongated member therein.

In yet another embodiment, the mounting base is removably connected to the casing using fastening means selected from a group consisting of bolts, screws, rivets.

In one embodiment, the casing sidewall comprises a first planar portion defining a first plane and a second planar portion defining a second plane perpendicular to the first plane; further wherein the first opening is defined in the first planar portion and the second opening is defined in the second planar portion.

In a further embodiment, the frame structure further comprises a half-silvered mirror extending on a third plane angled away from the first plane and towards the second plane at a predetermined angle.

In yet a further embodiment, the predetermined angle is a 45 degree angle.

In another embodiment, the casing further comprises mounting means for securely mounting the half-silvered mirror to the interior of the casing sidewall. It will be appreciated that this configuration substantially prevents movement of the half-silvered mirror relative to the casing and to the first and second cameras mounted to the casing and therefore advantageously prevents distortion of the recorded images such as distortion caused by keystone effect or the like.

In a further embodiment, the half-silvered mirror has a first mirror end and a second mirror end located opposite the first end, further wherein the mounting means comprise a first frame member for securing the first mirror end thereto and a second frame member for securing the second mirror end thereto, each frame member having first and second adjacent sides defining a first corner, second and third adjacent sides defining a second corner located opposite the first corner, and an oblique member extending between the first and second corners, the oblique member being adapted for fastening a corresponding end of the half-silvered mirror thereto.

In another embodiment, the casing is rectangular and the casing sidewall comprises a top wall and a bottom wall spaced from the top wall and parallel thereto, the second opening being defined in the top wall; a back wall extending between the top and bottom walls and perpendicular thereto, the first opening being defined in the back wall; a first lateral wall and a second lateral wall spaced from the first lateral wall and parallel thereto, the first and second lateral walls being perpendicular to the top, bottom and back walls, the half-silvered mirror extending between the first and second lateral walls and being securely mounted thereto.

In yet another embodiment, the first and second planar portions are rigidly interconnected and are manufactured from a rigid material selected from a group consisting of aluminum, steel, wood and polyvinyl chloride. In this configuration, the first and second planar portions are advantageously maintained perpendicular to each other, which advantageously enables the first and second camera supports to be properly supported in order to substantially prevent movement of the first and second cameras relative to the beam splitting device.

In one embodiment, the outer frame comprises a plurality of elongated members parallel to each other and spaced apart to define the cavity therebetween. In this configuration, the outer frame surrounds the corresponding camera and thereby provides substantial protection from impact to the corresponding camera. For instance, if the frame structure is used to record images of an action sequence, the frame structure may advantageously be positioned substantially close to the action without risking damage to the first and second cameras, which are usually substantially costly.

In a further embodiment, the plurality of elongated members comprises four elongated members extending away from the casing and forming a generally rectangular pattern.

In another embodiment, the outer frame further comprises at least one rigid binding member extending peripherally relative to the cavity, the rigid binding member holding the plurality of elongated frame members for maintaining the configuration of the outer frame. In this configuration, the at least one rigid binding member advantageously holds the plurality of elongated frame members spaced apart while leaving the cavity substantially uncluttered in order to provide sufficient space for the corresponding camera to be received in the cavity.

In a further embodiment, the at least one rigid binding member comprises a first rigid binding member, a second rigid binding member spaced from the first rigid binding member and a camera mounting member extending between the first and second rigid binding members for mounting the corresponding camera thereto.

In yet a further embodiment, the first and second rigid binding members are slidably connected to the elongated members to enable selective movement of the camera mounting member and of the corresponding camera mounted thereto towards and away from the casing. This configuration is of great advantage to enable the corresponding camera to be set to a desired distance from the beam splitting device.

In another embodiment, the rigid binding member comprises a polygonal frame having a plurality of corners, each corner having an opening defined therein adapted for slidably receiving a respective one of the elongated members therein. This configuration enables the rigid binding member to be readily disassembled, which is of great advantage for storing and/or transporting the frame structure, and reassembled afterwards for use.

According to another aspect, there is provided a kit for a frame structure for use in stereoscopic imaging. The kit comprises a casing having a casing sidewall and first and second openings defined on the casing sidewall, the casing being sized and shaped to receive a beam splitting device therein for directing a first portion of an incoming light beam towards the first opening and a second portion of the incoming light beam towards the second opening; a first camera support for holding a first camera and a second camera support for holding a second camera, each of the first and second camera supports comprising an outer frame defining an internal cavity for receiving a corresponding camera therein, attaching means for connecting the outer frame to the casing sidewall such that the corresponding camera is pointing towards a corresponding one of the first and second opening, the attaching means comprising at least three connecting portions for contacting the casing sidewall and for positioning around the corresponding opening.

BRIEF DESCRIPTION OF THE DRAWINGS

In order that the invention may be readily understood, embodiments of the invention are illustrated by way of example in the accompanying drawings.

Further details of the invention and its advantages will be apparent from the detailed description included below.

DETAILED DESCRIPTION

In the following description of the embodiments, references to the accompanying drawings are by way of illustration of an example by which the invention may be practiced. It will be understood that other embodiments may be made without departing from the scope of the invention disclosed.

Figure 1:
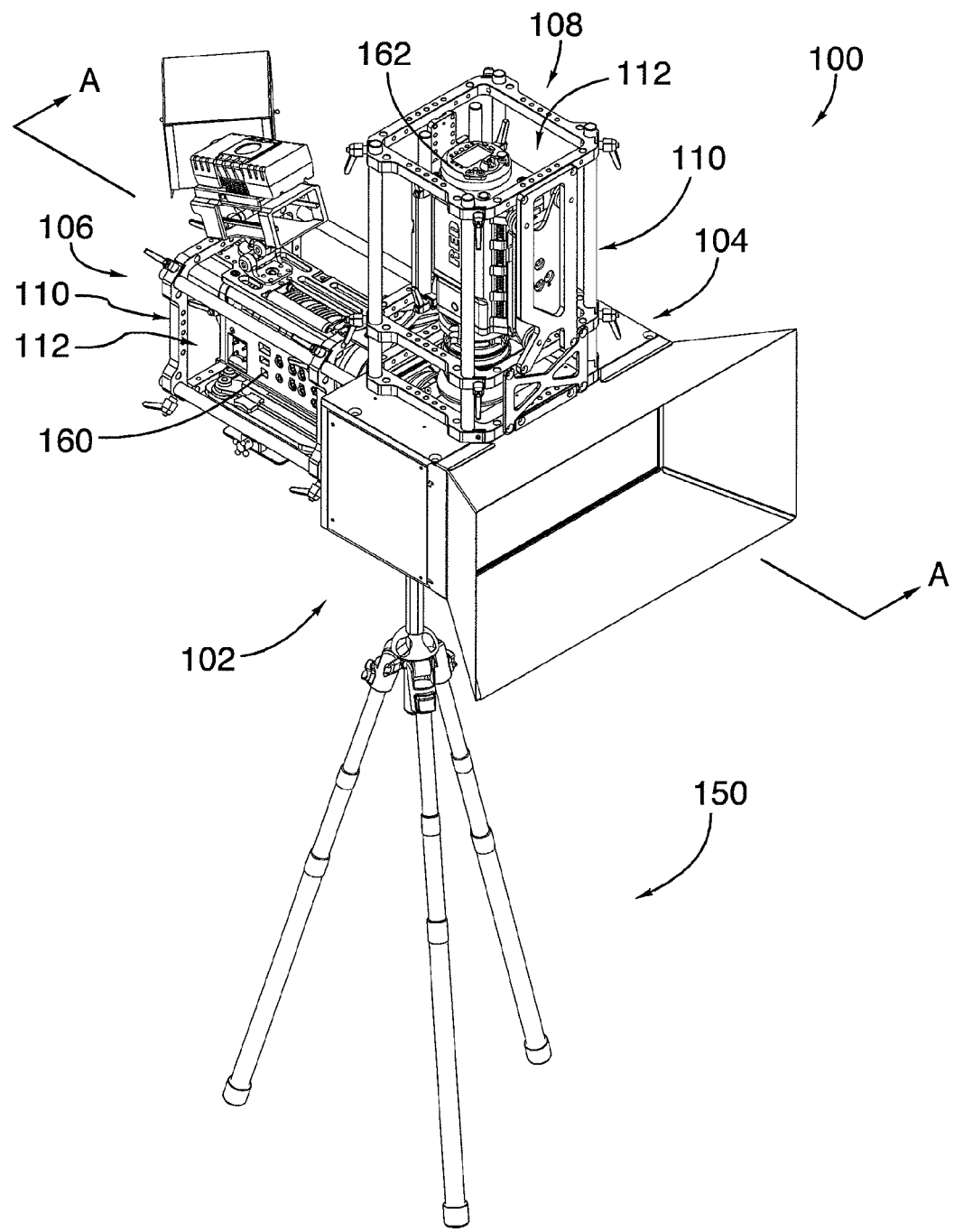
FIG. 1 is a drawing showing a perspective view of a stereoscopic camera rig comprising a frame structure for stereoscopic imaging, in accordance with one embodiment.
Figure 2:
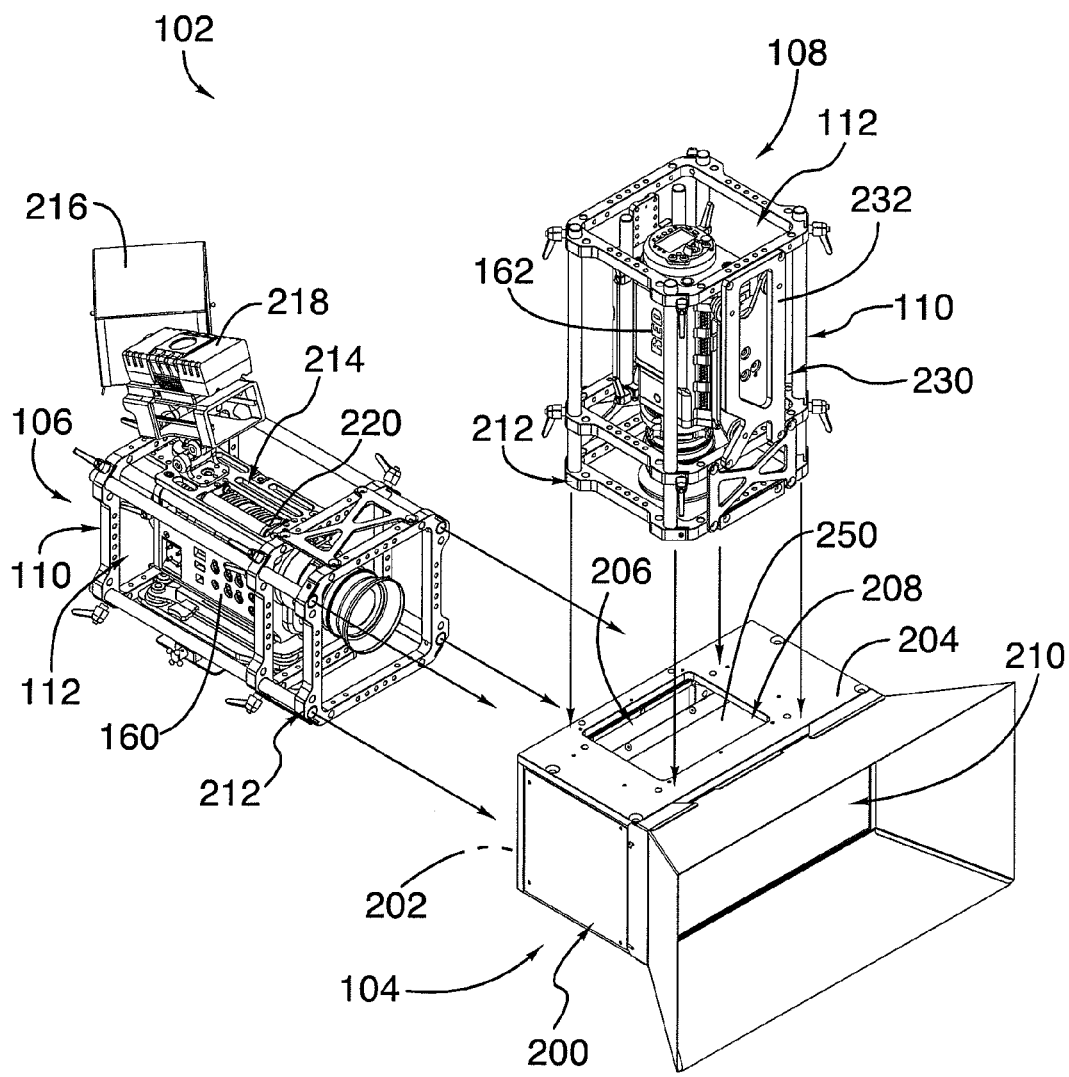
FIG. 2 is a drawing showing a perspective view, exploded, of the frame structure for stereoscopic imaging shown in FIG. 1.

Referring to FIGS. 1 and 2, there is provided a stereoscopic camera rig 100 for stereoscopic imaging, in accordance with one embodiment.

The stereoscopic camera rig 100 comprises a frame structure 102 pivotably mounted to a stand, or tripod 150. The frame structure 102 comprises a casing 104, a first camera support 106 and a second camera support 108.

The casing 104 comprises a casing sidewall 200 having first and second planar surfaces 202, 204 which are perpendicular to each other and in which first and second openings 206, 208 are respectively defined. A third opening, or inlet opening 210, is further defined in the casing sidewall 200 in order to allow an incoming light beam to enter the casing 104.

Figure 3A:
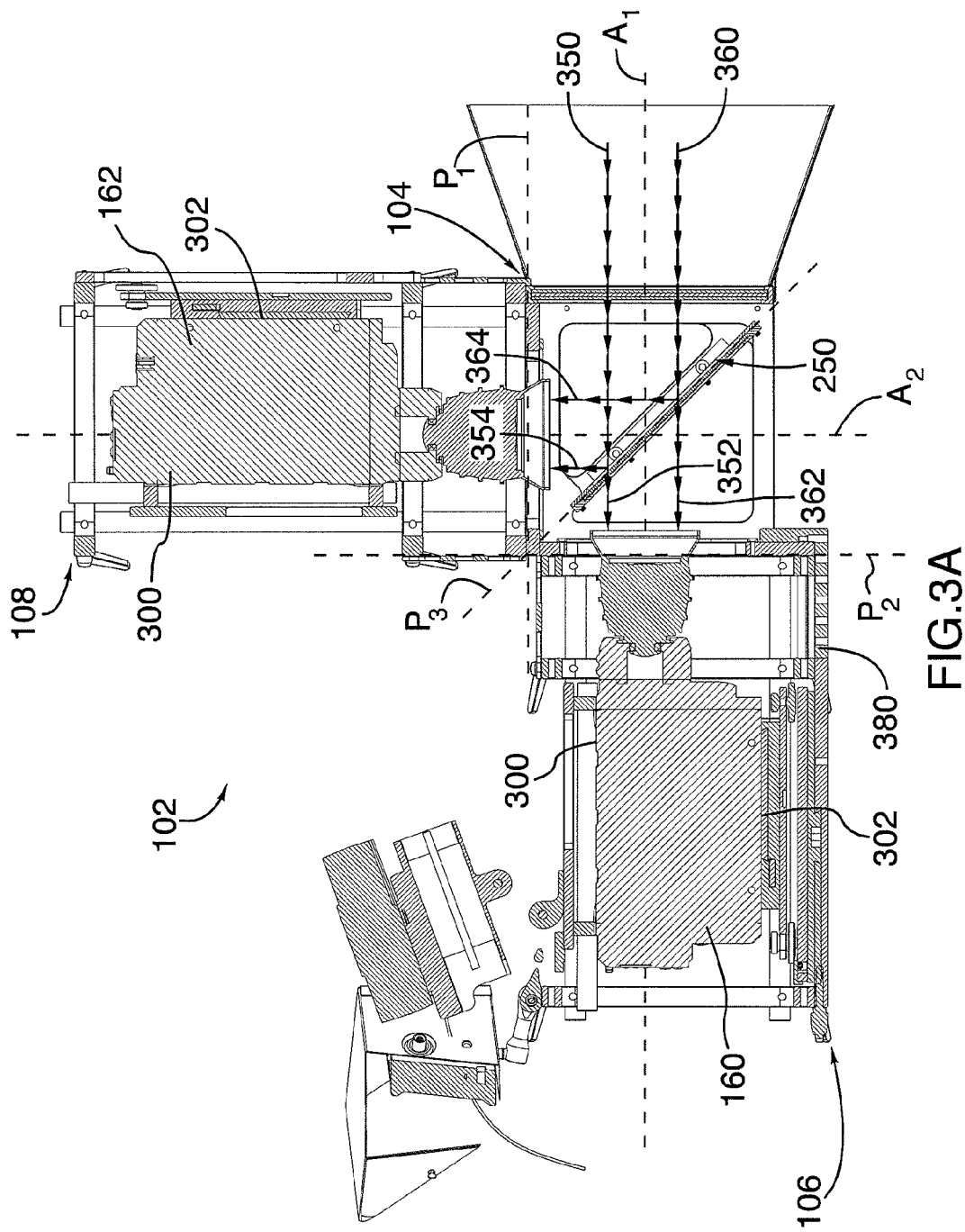
FIG. 3A is a drawing showing a cross-section view, taken along line A-A of FIG. 1, of the frame structure for stereoscopic imaging shown in FIG. 1.

The casing 104 is further sized and shaped to receive a beam splitting device therein. In the illustrated embodiment, the beam splitting device comprises a half-silvered mirror 250, which is provided in the casing 104. The half-silvered mirror 250 is configured for directing a first portion of the incoming light beam towards the first opening 206 and a second portion of the incoming light beam towards the second opening 208, as best shown in FIG. 3A.

In this stereoscopic camera rig 100, a first camera 160 and a second camera 162 are further provided. The first and second camera supports 106, 108 are mounted to the casing 104 and are adapted to respectively hold the first and second cameras 160, 162 for recording one or more images of a subject towards which the frame structure 102 is pointed.

Each of the first and second camera supports 106, 108 comprises an outer frame 110 defining an internal cavity 112 for receiving a corresponding camera therein. More specifically, the internal cavity 112 of the first camera support 106 is for receiving the first camera 160, and the internal cavity 112 of the second camera support 108 is for receiving the second camera 162. In this configuration, the outer frame 110 of the first and second camera supports 106, 108 substantially protects the first and second cameras 160, 162 from impact with other objects, as it will become apparent below.

Each of the first and second camera supports 106, 108 further comprises attaching means 212 for connecting the corresponding outer frame 110 to the casing sidewall 200 such that the corresponding camera, when received in the internal cavity 112, is pointing towards a corresponding one of the first and second openings 206, 208 of the casing 104. More specifically, the attaching means 212 of the first camera support 106 is for connecting the outer frame 110 of the first camera support 106 to the casing sidewall 200 such that the first camera 160 is pointing towards the first opening 206. Similarly, the attaching means 212 of the second camera support 108 is for connecting the outer frame 110 of the second camera support 108 to the casing sidewall 200 such that the second camera 162 is pointing towards the second opening 208.

The skilled addressee will appreciate that, according to this configuration, the first and second cameras 160, 162 are further directed towards the half-silvered mirror 250, such that the first portion of the incoming light beam is directed towards the first camera 160 and the second portion of the incoming light beam is directed towards the second camera 162 for enabling the first and second cameras to record images of the subject.

It will be appreciated that, when the inlet opening 210 is directed towards the subject and the subject is exposed to a light source, the subject will reflect a plurality of light beams towards the half-silvered mirror 250. The first portions of the plurality of light beams, as received by the first camera 160, together form the first image, while the second portions of the plurality of light beams, as received by the second camera 162, together form the second image which may be slightly different from the first image, as it will become apparent below.

In one embodiment, a camera accessory mount 214 is further secured to one or both of the first and second cameras 160, 162. The camera accessory mount 214 is adapted for securing accessories, such as a monitor 216 and/or a battery pack 218 operatively connected to one or both of the first and second cameras 160, 162, or any other accessories known to the skilled addressee, to the stereoscopic camera rig 100. For instance, the camera accessory mount 214 may comprise a plurality of apertures sized to accommodate fasteners in order to fasten one or more accessories to the camera accessory mount 214. The camera accessory mount 214 may further comprise a handle 220 for manipulating a corresponding one of the first and second cameras 160, 162.

Figure 3B:
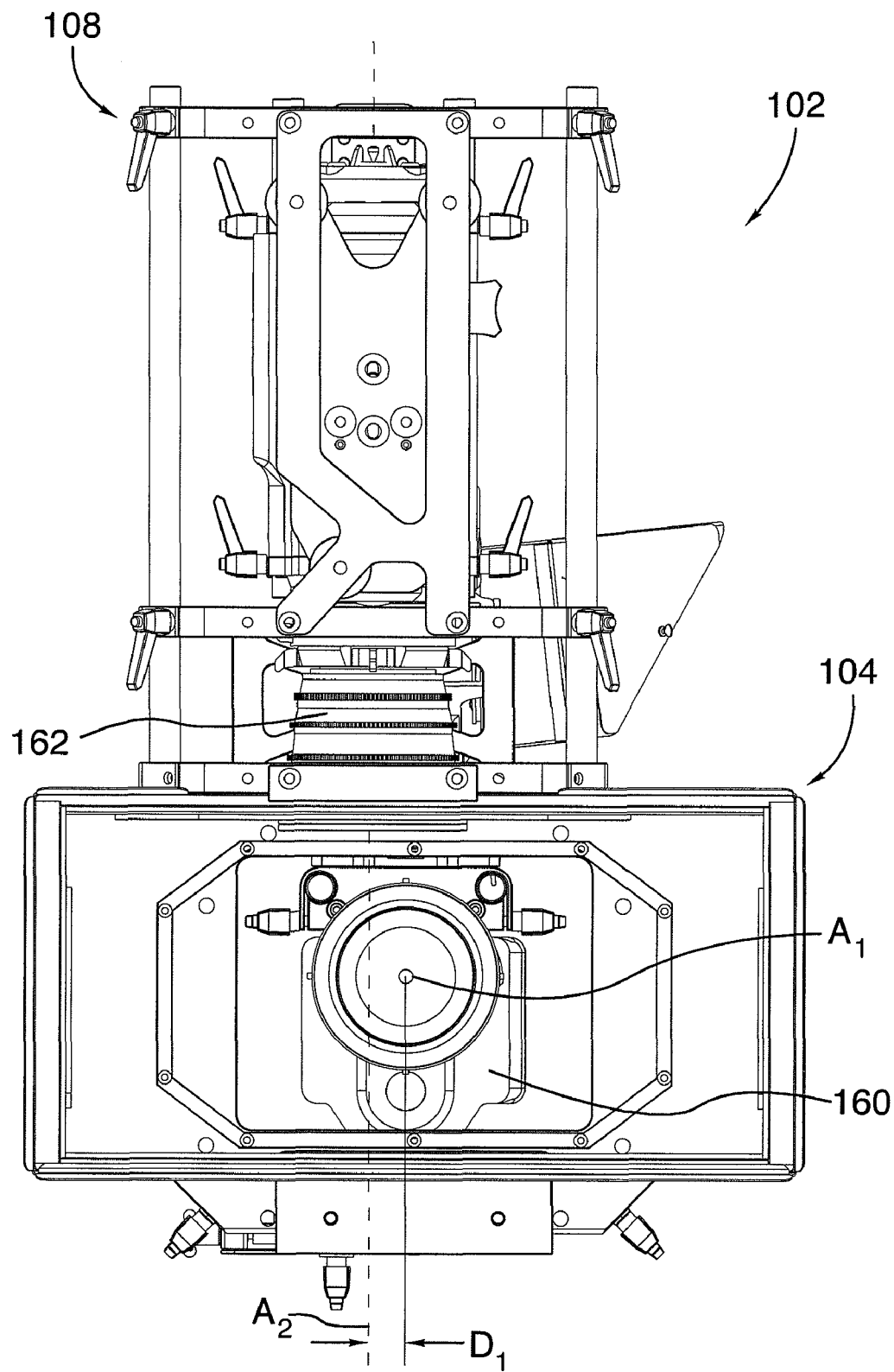
FIG. 3B is a drawing showing a front elevation view of the frame structure for stereoscopic imaging shown in FIG. 1, with the beam-splitting device, the filters and the hood omitted.

Now referring to FIGS. 3A and 3B, the first and second cameras 160, 162 respectively have first and second longitudinal axes $A_1$, $A_2$, each corresponding generally to the axes of the lens of the first and second cameras 160, 162. When the outer frame 110 of first and second camera supports 106, 108 are properly connected to the casing sidewall 200 using the attachment means 212, the first and second cameras 160, 162 are positioned such that the first and second longitudinal axes $A_1$, $A_2$ are substantially orthogonal relative to each other, but also substantially offset laterally relative to each other by a distance $D_1$, the "inter-axial distance". This configuration enables the first and second cameras 160, 162 to simultaneously record the first and second images of the subject, respectively, which are slightly different from each other. The first and second images may then be processed by image processing means, not shown, operatively connected to the first and second cameras 160, 162 to create a three-dimensional image of the subject.

More specifically, the first and second planar surfaces 202, 204 of the casing 104 respectively define first and second planes $P_1$, $P_2$ which are perpendicular to each other. The half-silvered mirror 250 is positioned on a third plane $P_3$ which is angled away from the first plane $P_1$ and towards the second plane $P_2$ at a predetermined angle. In the illustrated embodiment, the predetermined angle is an angle of 45 degrees. It will be appreciated that the value of the predetermined angle used may be selected according to the type and specifications of the half-silvered mirror used and to the positions of the first and second openings 206, 208 of the casing 104 in order for the first and second portions of the light beam to be respectively directed by the half-silvered mirror 250 towards the first and second openings 206, 208.

Furthermore, when a first light beam coming from an upper portion of the subject, or upper light beam 350, is directed towards the half-silvered mirror 250, a first portion 352 of the upper light beam 350 is transmitted through the half-silvered mirror 250 towards the first camera 160 and a second portion 354 of the upper light beam 350 is reflected on the half-silvered mirror 250 towards the second camera 162. Similarly, when a second light beam coming from a lower portion of the subject, or lower light beam 360, is directed towards the half-silvered mirror 250, a first portion 362 of the upper light beam 350 is transmitted through the half-silvered mirror 250 towards the first camera 160 and a second portion 364 of the upper light beam 350 is reflected on the half-silvered mirror 250 towards the second camera 162. As shown in FIG. 3A, the first portion of the upper light beam is located above the first portion of the lower light beam, but reflection on the half-silvered mirror 250 causes the second portion of the upper light beam to be located near the first camera 160 and the second portion of the lower light beam to be located near the subject.

Both the first camera 160 and the second camera 162 comprise a top end 300 and a bottom end 302 which defines an "upright" orientation of the corresponding image recorded by the camera. In the illustrated embodiment, the first camera is positioned such that its top end 300 is located above its bottom end 302 to enable the first portion of the upper light beam to be directed near the top end 300 of the first camera 160 and the first portion of the lower light beam to be directed near the bottom end of the first camera 160. Similarly, the second camera 162 is positioned such that its top end 300 is located near the first camera 160 and its bottom end 302 is located near the subject to enable the first portion of the upper light beam to be directed near the top end 300 of the first camera 160 and the first portion of the lower light beam to be directed near the bottom end of the first camera 160, as it will become apparent below.

This configuration enables the first and second cameras to record images in the "upright" orientation, which is of great advantage for essentially eliminating costly and time-consuming post-production operations needed to reorient the second image in order to combine it with the first image. Alternatively, the second camera 162 may be positioned such that its top end 300 is positioned near the subject and its bottom end 302 is positioned near the first camera 160. The image processing means, operatively connected to the second camera 162, may then be used to reorient the second image to the "upright" orientation.

Now referring to FIGS. 4 and 5, the first camera support 106 will be described. It will be appreciated that, since the first and second camera supports 106, 108 are substantially similar, description of only the first camera support 106 will be sufficient for a person skilled in the art to understand the structure and workings of both the first and second camera supports 106, 108.

In the illustrated embodiment, the outer frame 110 of the first camera support 106 comprises a plurality of elongated frame members 400 extending parallel to each other. The plurality of elongated frame members 400 are spaced apart to define the cavity 112 therebetween, which is sized and shaped for receiving the first camera 160. In the illustrated embodiment, the outer frame 110 has a generally rectangular configuration and comprises four elongated frame members 400a, 400b, 400c, 400d which, when the outer frame 110 is properly attached to the casing sidewall 200, extend away from the casing sidewall 200, generally perpendicularly to the first planar surface 202. Each of the four elongated frame members 400a, 400b, 400c, 400d comprises a first end 402 connected to the attaching means 212 and a second end 404 which is located away from the casing 104 when the outer frame 110 is attached to the casing sidewall 200.

In the illustrated embodiment, each elongated frame member 400 comprises a hollow tube having a circular cross-section. This configuration substantially contributes to reducing the overall weight of the first camera support 106 while providing substantial rigidity to the outer frame 110, as one skilled in the art will appreciate. Alternatively, each elongated frame member 400 may be full and/or have a rectangular cross-section or any other shape known to a person skilled in the art which would provide the plurality of elongated frame members 400 with sufficient rigidity for the intended use of the frame structure 102.

In an alternative embodiment, the plurality of elongated frame members 400 instead comprises three elongated frame members defining a triangular configuration. In yet another embodiment, the outer frame 110 does not comprise any elongated frame member, but instead comprises a camera support sidewall mountable to the casing sidewall 200 such that the camera support sidewall extends away from the casing 104. In this embodiment, the camera support sidewall may be tubular, rectangular or have any other suitable shape. It will be appreciated that the outer frame 110 may have any other configuration deemed appropriate by the skilled addressee for the intended use of the frame structure 102, as long as the outer frame 110 defines an internal cavity which is sized and shaped for receiving the first camera 160.

Figure 4:
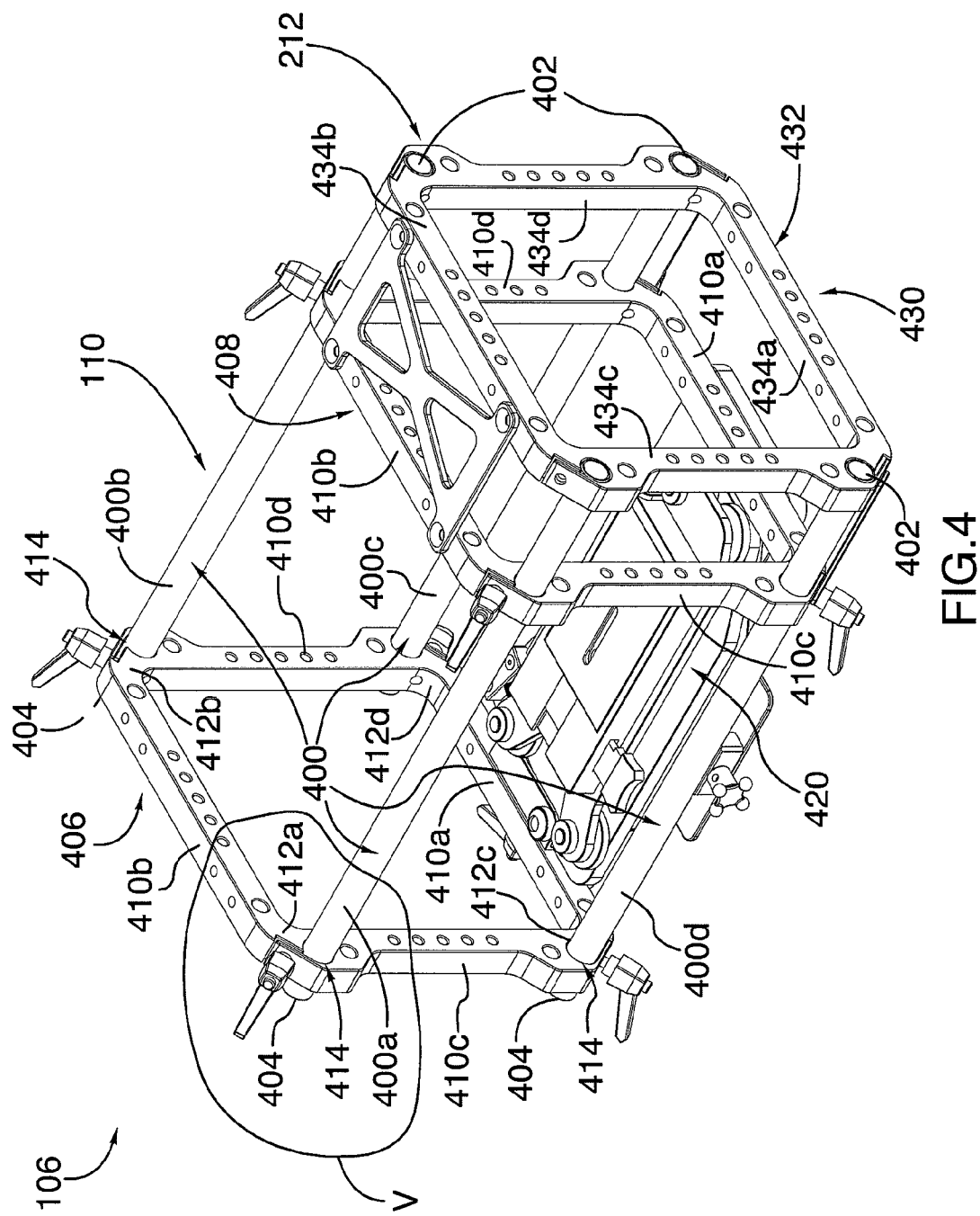
FIG. 4 is a drawing showing a perspective view of a first camera support for the frame structure shown in FIG. 1.

Still referring to FIG. 4, the outer frame 110 further comprises at least one rigid binding member for holding the plurality of elongated frame members 400 together and thereby maintaining the configuration of the outer frame 110. In the illustrated embodiment, first and second rigid binding members 406, 408 are provided. The first rigid binding member 406 is connected to the four elongated frame members 400a, 400b, 400c, 400d near the second end 404 thereof and the second rigid binding member 408 is spaced from the first rigid binding member 406, towards the first end 402 of the four elongated frame members 400a, 400b, 400c, 400d.

Each of the first and second rigid binding members 406, 408 is generally rectangular and comprises parallel first and second elongated side members 410a, 410b and third and fourth elongated side members 410c, 410d which extend perpendicularly to the first and second side members 410a, 410b. The first, second, third and fourth elongated side members 410a, 410b, 410c, 410d are interconnected to define four corner portions 412a, 412b, 412c, 412d, in each of which an opening 414 is provided for receiving one of the four elongated frame members 400a, 400b, 400c, 400d. In this configuration, the first and second rigid binding members 406, 408 extend peripherally relative to the cavity 112 of the outer frame 110 and thereby advantageously hold the four elongated frame members 400a, 400b, 400c, 400d spaced apart while leaving the cavity 112 substantially uncluttered in order to provide sufficient space for the first camera 160 to be received in the cavity 112.

In the illustrated embodiment, the first and second binding members 406, 408 are slidably connected to the four elongated frame members 400a, 400b, 400c, 400d. As an example of this slidable connection, the connection of elongated frame member 400a to the first binding member 406 will now be described. It will be appreciated that all connections of the first or second binding members 406, 408 with one of the four elongated frame members 400a, 400b, 400c, 400d are substantially similar.

Figure 5:
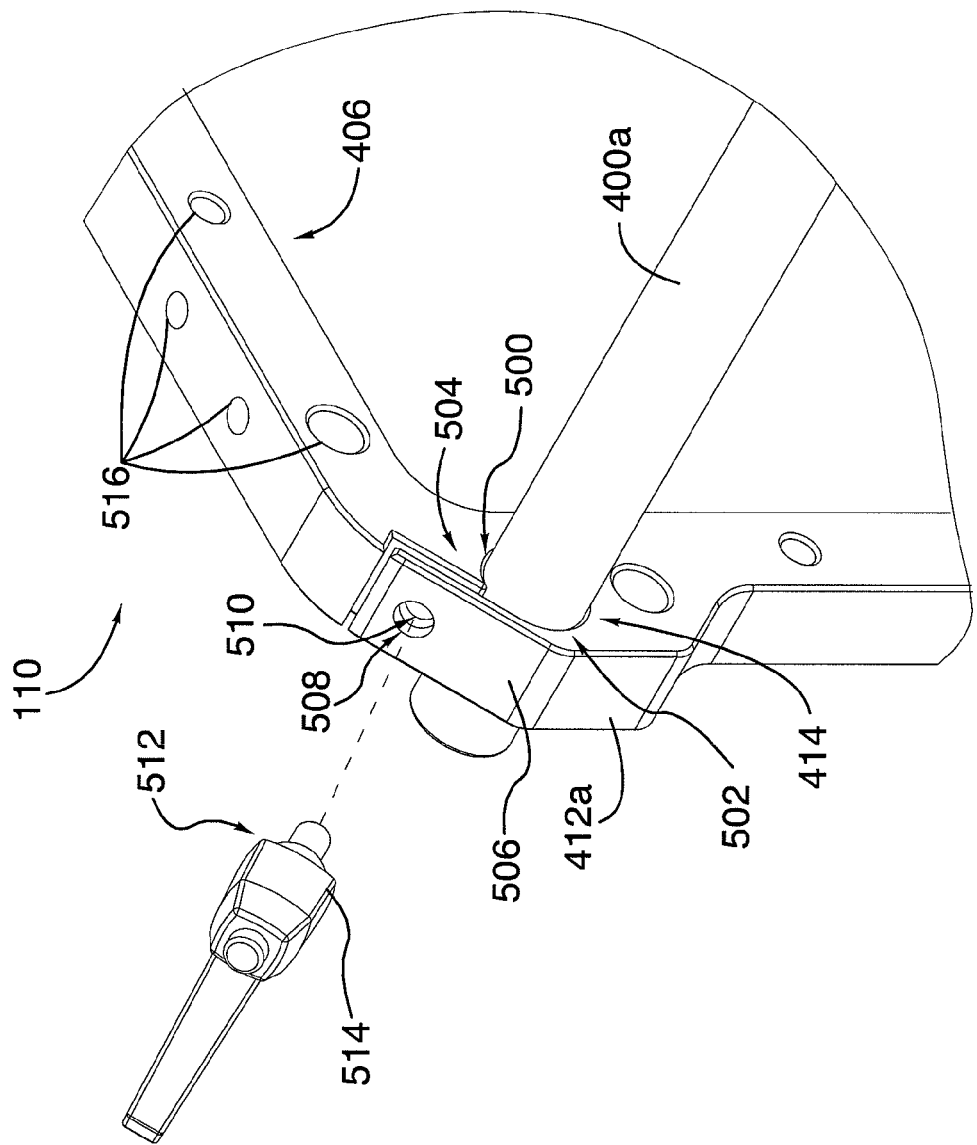
FIG. 5 is a drawing showing an enlarged view, taken from area V of FIG. 4, of the first camera support shown in FIG. 4.

Referring to FIG. 5, the opening 414 comprises a circular cutout 500 defined in the corresponding corner portion 412a between opposed, first and second cusp-shaped portions 502, 504. A flexible flap 506 extends from the first cusp-shaped portion 502 over the circular cutout 500 and overlaps the second cusp-shaped 504 portion to define a collar configuration. A first hole 508 is provided on the flexible flap 506 and a corresponding, threaded second hole 510 is provided on the second cusp-shaped portion 504. The first and second holes 508, 510 are aligned to enable a tightening screw 512, provided with a handle 514 to facilitate screwing and unscrewing in the illustrated embodiment, to operatively engage the first and second holes 508, 510. It will be appreciated that, in this configuration, screwing of the tightening screw 512 causes the handle 514 to abut the flexible flap 506 and urges the flexible flap 506 towards the second cusp-shaped portion 504, thereby tightening the circular cutout 500 around the elongated frame member 400a engaged therein and substantially preventing movement of the elongated frame member 400a relative to the first rigid member 406. The position of the first rigid binding member 406 is therefore locked relative to the elongated frame member 400a. The tightening screw 512 may further be unscrewed to enable the first rigid binding member 406 to move relative to the elongated frame member 400a and/or to enable the first rigid binding member 406 to be removed from the four elongated frame members 400a, 400b, 400c, 400d in order to disassemble the outer frame 110, for instance.

This configuration enables the outer frame 110 to be readily disassembled, which is of great advantage for storing and/or transporting the frame structure 102, and reassembled afterwards for use.

Alternatively, the first rigid binding member 406 may instead be slidably connected to the elongated frame member 400a using a set screw which engages the corner portion 412a and extends into the opening 414 in order to abut the elongated frame member 400a when screwed. It will be appreciated that in this configuration, the set screw creates friction against the elongated frame member 400a, which contributes to preventing the first rigid binding member 406 from moving relative to the elongated frame member 400a.

In yet another embodiment, the first and second rigid binding members 406, 408 may instead be secured to the four elongated frame members 400a, 400b, 400c, 400d using securing techniques known to the skilled addressee such as welding, gluing, interference fitting or the like.

In the embodiment shown in FIG. 5, a plurality of apertures 516 are further provided on the first and second rigid binding members 406, 408 in order to reduce their weight, as one skilled in the art will appreciate. Additionally, the plurality of apertures 516 may also be used for attaching one or more accessories, such as a monitor and/or a battery pack operatively connected to one of the first and second cameras 160, 162, or any other accessories known to the skilled addressee, on the outer frame 110.

Referring back to FIG. 4, the first camera support 106 further comprises a first camera mounting member 420 for receiving the first camera 160. The camera mounting member enables the first camera 160 to be mounted to the outer frame 110 and positioned such that the longitudinal axis $A_1$ of the first camera 160 is generally parallel to the four elongated frame members 400a, 400b, 400c, 400d and the lens is located near the first end 402 of the four elongated frame members 400a, 400b, 400c, 400d, and therefore near the first opening 206 of the casing sidewall 200, as best shown in FIG. 3A.

In the illustrated embodiment, the first camera mounting member 420 extends between the first elongated side member 410a of the first rigid binding member 406 and the first elongated side member 410a of the second rigid binding member 408 and is fastened thereto. Since the first and second rigid binding members 406, 408 are slidably movable relative to the four elongated frame members 400a, 400b, 400c, 400d, as explained above, this configuration enables selective movement of the first camera 160 mounted to the first camera mounting member 420 towards and away from the casing 104, which is of great advantage to set the first camera 160 to a desired distance from the half-silvered mirror 250.

In one embodiment, the first camera support 106 further comprises a setting member 450 securely connected to the first rigid binding member 406 and/or the second rigid binding member 408 for maintaining the first camera mounting member 420 and the first camera 160 mounted thereto to a desired position relative to the casing 104. The setting member 450 is fastened to the second rigid binding member 408 and to the attaching means 212 and has a generally cross-like shape which advantageously enables it to withstand substantially great forces to essentially prevent the second rigid binding member 408, and therefore the first camera mounting member 420 and the first camera 160 mounted thereto, from moving relative to the attaching means 212.

It will be appreciated that in this configuration, the setting member 450 maintains the first camera 160 at a first predetermined distance from the casing 104, which corresponds generally to a length of the setting member 450. In an alternative embodiment, the setting member 450 may be interchangeable with another setting member which has a different length in order to set the first camera 160 at a second predetermined distance from the casing, different from the first predetermined distance. This configuration would advantageously enable the first camera mounting member 420 to be set at a desired distance from the casing 104, for instance according to the type of lens used with the first camera 160 or the size of the first camera 160.

In yet another embodiment, the setting member 450 extends from the second binding member 408 towards the casing 104 and is adapted to abut the casing sidewall 200 when the first camera mounting member 420 is moved towards the casing 104 to thereby define a minimum distance at which the first camera 160 may be set from the casing 104.

Figure 6:
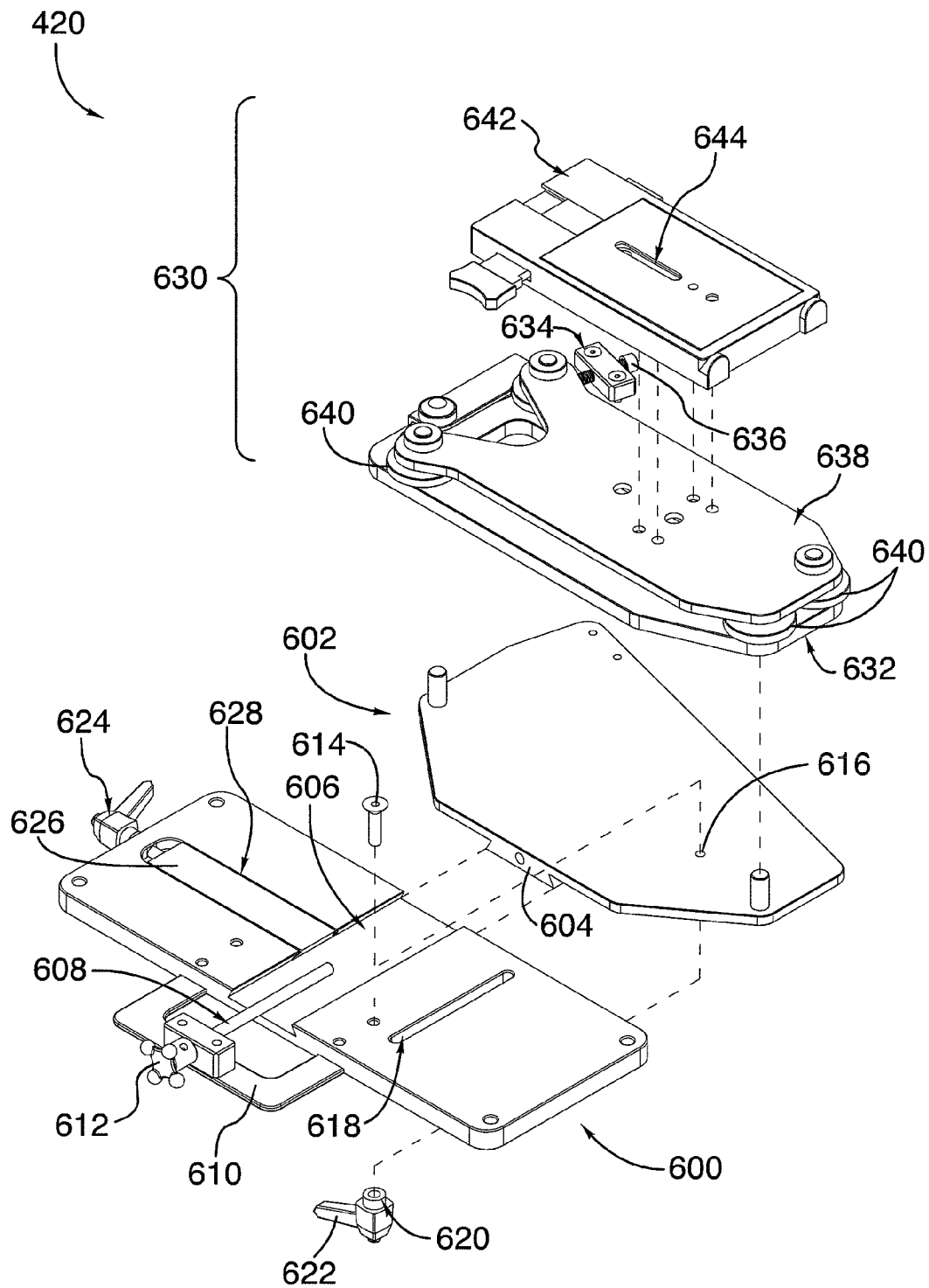
FIG. 6 is a drawing showing an exploded view of a camera mounting member for the frame structure shown in FIG. 1.

Now referring to FIG. 6, the first camera mounting member 420 comprises a base plate 600 adapted to be fastened to the first and second rigid binding members 406, 408 and an inter-axial setting plate 602 slidably connected to the base plate 600. More specifically, the inter-axial setting plate 602 comprises a dovetail portion 604 which projects downwardly and is sized and shaped to slidably engage a corresponding dovetail recess 606 of the base plate 600. An adjustment screw 608 is further secured to the base plate 600 by means of a C-shaped bracket member 610 and engages the dovetail portion 604 of the inter-axial setting plate 602 such that screwing and unscrewing the adjustment screw 608, using a handle 612 secured thereto, moves the inter-axial setting plate 602 laterally relative to the base plate 600.

A first set screw 614 engages a corresponding hole 616 defined in the inter-axial setting plate 602 and is movable along a groove 618 defined in the base plate 600 when the inter-axial setting plate 602 is moved laterally. The first set screw 614 further engages a nut 620 provided with a handle 622 for tightening the nut 620 on the first set screw 614 to compress the inter-axial setting plate 602 and the base plate 600 together between the first set screw 614 and the nut 620. It will be appreciated that this creates friction between the inter-axial setting plate 602 and the base plate 600 to thereby substantially prevent movement of the inter-axial setting plate 602 relative to the base plate 600 once a desired inter-axial position has been attained, as it will become apparent below.

A second set screw 624 is further provided. The second set screw 624 engages a friction block 626 which is slidably received in a corresponding recess 628 of the base plate 600. Unscrewing of the second set screw 624 moves the friction block 626 away from the dovetail portion 604 of the inter-axial setting plate 602 to enable lateral movement thereof within the dovetail recess 606 of the base portion 600. Screwing of the second set screw 624 moves the friction block 626 towards the dovetail portion 604 of the inter-axial setting plate 602 until the friction block 626 contacts the dovetail portion 604 and thereby creates friction therebetween to further substantially prevent movement of the inter-axial setting plate 602 relative to the base plate 600 once a desired inter-axial position has been attained.

A camera mounting module 630 is further mounted on the inter-axial setting plate 602. Such a camera mounting module 630 is described in greater details in U.S. patent application Ser. No. 12/128,448 entitled MODULAR STEREOSCOPIC RIG, filed on May 28, 2008, the specification of which is incorporated herein by reference.

In the illustrated embodiment, the camera mounting module 630 comprises a convergence setting plate 632 pivotably mounted on the inter-axial setting plate 602. A convergence adjustment mechanism 634 is secured to the inter-axial setting plate 602 to allow the horizontal orientation, or convergence, of the convergence setting plate 632 to be adjusted by selectively screwing and unscrewing a convergence adjustment screw 636.

The camera mounting module 630 further comprises a tilt setting plate 638 which is movably mounted on the convergence setting plate 632. The tilt setting plate 638 comprises a plurality of adjustment wheels 640 which are rotatable for setting a vertical angle, or tilt, of the tilt setting plate 638.

A camera attaching plate 642 is further provided for attaching the first camera 160 to the camera mounting module 630. The camera attaching plate 642 is secured to the tilt setting plate 638 and comprises an opening 644 adapted to receive therein a corresponding attaching pin, not shown, of the first camera 160 and a quick release mechanism 646 for enabling the first camera 160 to be readily attached to or removed from the camera attaching plate 642.

In this configuration, the first camera 160, when attached to the camera attaching plate 642, may be set according to desired settings: using the handle 612 of the adjustment screw 608, the inter-axial distance $D_1$ between the first camera 160 and the second camera 162, as best shown in FIG. 3A, may be adjusted; using the convergence adjustment mechanism 634, the convergence of the first camera 160 relative to the second camera 162 may be adjusted; and using the adjustment wheels 640 of the tilt setting plate 638, the tilt of the first camera 160 may be adjusted. This configuration therefore advantageously enables the first camera 160 to be readily set in a desired position in order to obtain the three-dimensional information needed to produce a desired three-dimensional image.

Referring back to FIG. 2, the second camera support 108 comprises a second camera mounting member 230. In the illustrated embodiment, the second camera mounting member 230 is substantially similar to the first camera mounting member 420, but does not comprises a base plate nor an inter-axial setting plate. Instead, the second camera mounting member 230 comprises a convergence setting plate 232 which is directly fastened to the outer frame 110 of the second camera support 108. Furthermore, the second camera 162 is set to enable recording of the second image in the "upright" orientation, as mentioned above. Accordingly, the second camera mounting member 230 is positioned towards the subject and away from the first camera support 106 on the outer frame 110 of the second camera support 108.

Alternatively, the second camera mounting member 230 may instead be similar to the first camera mounting member 420 to enable inter-axial adjustment of the first and second cameras 160, 162 by moving the second camera 162 laterally.

Referring back to FIG. 4, the attaching means 212 comprise at least three connecting portions which are positioned around the first opening 206 when the first camera support 106 is properly mounted to the casing 104.

It will be appreciated that if the attaching means 212 comprised only one connecting portion, or anchoring point, such as a single attaching rod connecting the outer frame 110 to the casing sidewall 200, deformation of the first camera support 106 caused by bending may still occur about two axes. Similarly, if only two connecting portions, or anchoring points, were provided, such as two attaching rod connecting the outer frame 110 to the casing sidewall 200, deformation of the first camera support 106 caused by bending about a first axis would be substantially prevented, but deformation would still be possible about a second axis parallel to a plane defined by the two attaching means. By providing at least three connecting portions, or anchoring points, which are spread apart around the first opening 206, and therefore are not located in a same plane, this configuration substantially eliminates deformations of the first camera support 106 caused by bending, which is of great advantage.

In the illustrated embodiment, the at least three connecting portions are interconnected to form a mounting base 430 adapted to be fastened to the casing sidewall 200. The mounting base 430 comprises a peripheral frame member 432 having a plurality of elongated side members 434 adapted to be positioned around the first opening 206 in a generally rectangular configuration.

The peripheral frame 432 is substantially similar to the first and second rigid binding members 406, 408 of the outer frame 110, and comprises four interconnected elongated side members 434a, 434b, 434c, 434d, each of which is connected to an adjacent elongated side member to define a corner portion 436 of the peripheral frame member 432 therebetween. Similarly to the first and second rigid binding members 406, 408, an opening 438 is defined in each corner portion 436 of the peripheral frame member 432 for receiving one of the four elongated frame members 400a, 400b, 400c, 400d of the outer frame 110. The peripheral frame member 432 may be securely connected to the four elongated frame members 400a, 400b, 400c, 400d using securing techniques know to the skilled addressee such as gluing or welding or, alternatively, be removably connected thereto using a collar configuration such as the one described above in relation to the first and second rigid binding members 406, 408.

In another embodiment, the peripheral frame member 432 is not secured to the four elongated frame members 400a, 400b, 400c, 400d by any means other than the setting member 450, which extends between the second rigid binding member 408 and the peripheral frame member 432.

Still referring to FIG. 4, the peripheral frame member 432 is further provided with a plurality of holes 432 sized to accommodate fasteners, not shown, such as bolts, screws, rivets, or any other suitable fasteners, for removably connecting the peripheral frame member 432, and therefore the outer casing 110 connected thereto, to the casing sidewall 200. Alternatively, the peripheral frame member 432 may be secured to the casing sidewall 200 using clamps or securing techniques known to the skilled addressee such as welding or the like.

Alternatively, the at least three connecting portions may be discrete from each other. For instance, in one embodiment, the attaching means 212 do not comprise a mounting base 430, but instead comprises the first ends 402 of the four elongated frame members 400a, 400b, 400c, 400, which are directly secured to the casing sidewall 200. It will be appreciated that the attaching means 212 may be configured according to one of various configurations, as long as the attaching means 212 comprises at least three connecting portions which are substantially spread apart and are positioned around the first opening 206.

Figure 7:
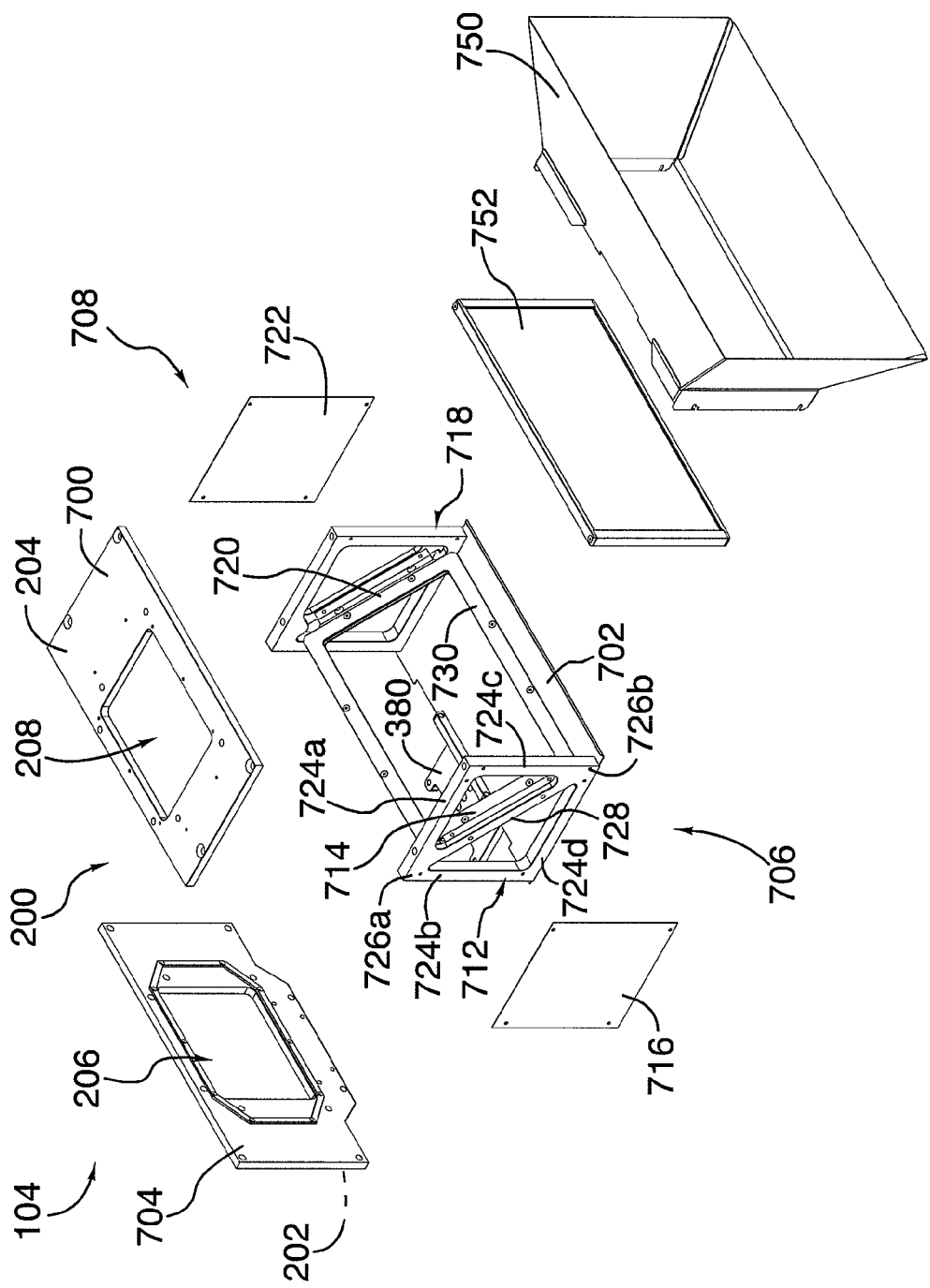
FIG. 7 is a drawing showing an exploded view of a casing for the frame structure shown in FIG. 1.

Now referring to FIG. 7, the casing 104 is generally rectangular and has a box configuration for receiving the half-silvered mirror 250 therein and substantially preventing unwanted light beams coming from sources other than the subject to be directed towards the half-silvered mirror 250. Such unwanted light beams may adversely affect the quality of the recorded images, as one skilled in the art will appreciate.

In one embodiment, the interior of the casing 104 is colored in a dark color, such as black, and/or comprises a hood 750 extending outwardly from the casing sidewall 200, around the inlet opening 210, to further prevent unwanted light beams to be directed towards the half-silvered mirror 250 and/or the first and second cameras 160, 162. Additionally, one or more filters 752 may further be provided over the inlet opening 210 in order to provide desired characteristics to the incoming light beam.

Still referring to FIG. 7, the casing sidewall 200 comprises top and bottom walls 700, 702 which are spaced apart and extend parallel to each other. The casing sidewall 200 further comprises a back wall 704 which extends between the top and bottom walls 700, 702, perpendicularly thereto and opposite the inlet opening 210.

In the illustrated embodiment, the back wall 704 forms the first planar surface 202 in which the first opening 206 is defined. The back wall 704 is therefore adapted for attaching the first camera support 106 thereto. Similarly, the top wall 700 forms the second planar surface 204 in which the second opening 208 is defined, and is therefore adapted for attaching the second camera support 108 thereto. It will be appreciated that the first and second openings 206, 208 are sized and shaped to prevent obstructing the field of view of the first and second cameras 160, 162 when the first and second cameras 160, 162 are set at a desired position relative to the casing 104.

The casing sidewall 200 further comprises a pair of lateral walls 706, 708 which extend parallel to each other and are spaced apart to receive the half-silvered mirror 250 therebetween. In the illustrated embodiment, the half-silvered mirror 250 is generally rectangular and extends between the first lateral wall 706 and the second lateral wall 708.

The casing 104 further comprises mounting means 710 for securely mounting the half-silvered mirror 250 to the interior of the casing sidewall 200. In the illustrated embodiment, the mounting means 710 enable the half-silvered mirror 250 to be mounted and secured to the first and second lateral walls 706, 708.

More specifically, the first lateral wall 706 comprises a first frame member 712 for securing a first end 714 of the half-silvered mirror 250 thereto and a first panel member 716 sized and shaped to cover the first frame member 712. Similarly, the second lateral wall 708 comprises a second frame member 718 for securing a second end 720, located opposite the first end 714, of the half-silvered mirror 250 thereto and a second panel member 722 sized and shaped to cover the second frame member 718.

Each of the first and second frame members 712, 718 is generally rectangular and comprises first, second third and fourth sides 724a, 724b, 724c, 724d. The first and second sides 724a, 724b are adjacent and define a first corner 726a of the corresponding one of the first and frame members 712, 718. Similarly, the third and fourth sides 724c, 724d are also adjacent and define a second corner 726b which is located opposite the first corner 726a. Each of the first and second frame members 712, 718 further comprises an oblique member 728 which extends between the first and second corners 726a, 726b, along the third plane $P_3$ of the half-silvered mirror 250, as best shown in FIG. 3A.

In the illustrated embodiment, the half-silvered mirror 250 is mounted in a mirror frame 730 which is fastened to the oblique member 728 of the first frame member 712 near the first end 714 of the half-silvered mirror 250 and to the oblique member 728 of the second frame member 718 near the second end 720 of the half-silvered mirror 250. The mirror frame 730 may be fastened thereto using known fasteners such as screws, bolts, rivets or any other fasteners known to the skilled addressee. It will be appreciated that this configuration substantially prevents movement of the half-silvered mirror 250 relative to the casing 104 and to the first and second cameras 160, 162 mounted to the casing 104 and therefore advantageously prevents distortion of the recorded images such as distortion caused by keystone effect or the like.

Furthermore, it will be appreciated that the first and second frame members 712, 718 further provide substantial rigidity to the casing 104. More specifically, the top wall 700 of the casing sidewall 200 abuts the first side 724a of the first and second frame members 712, 718, and the back wall 704 of the casing sidewall 200 abuts the second side 724b of the first and second frame members 712, 718. In this configuration, the top and back walls 700, 704 are rigidly interconnected, which advantageously maintains the top and back walls 700, 704 perpendicular to each other and enables the first and second camera supports 106, 108 to be properly supported in order to substantially prevent movement of the first and second cameras 160, 162 relative to the half-silvered mirror 250.

To further provide rigidity to the casing 104, the top wall 700, bottom wall 702, back wall 704 and first and second lateral walls 706, 708 may all be interconnected using rigid bonding elements such as welds, screws, rivets, bolts or any other rigid bonding elements which the skilled addressee would deem suitable to provide substantial rigidity to the casing 104. In one embodiment, the top wall 700, bottom wall 702, back wall 704 and first and second lateral walls 706, 708 are further manufactured from a rigid material selected from a group consisting of aluminum, steel, wood and polyvinyl chloride, to further provide rigidity to the casing 104.

In the illustrated embodiment, the casing sidewall 200 further comprises a support plate 380 which extends rearwardly from the bottom wall 702. The support plate 380 is adapted to receive a portion of the first camera support 106 thereon and to support the first camera support 106 in a cantilever configuration, as best shown in FIG. 3A. This configuration advantageously provides substantial rigidity to the frame structure 102 and further contributes to prevent the first camera support 106 from moving relative to the casing 104 and/or from deforming due to bending caused by the weight of the first camera 160. In the illustrated embodiment, the support plate 380 is further used for mounting the stand 150 to the frame structure 102, as shown in FIG. 8.

Figure 8:
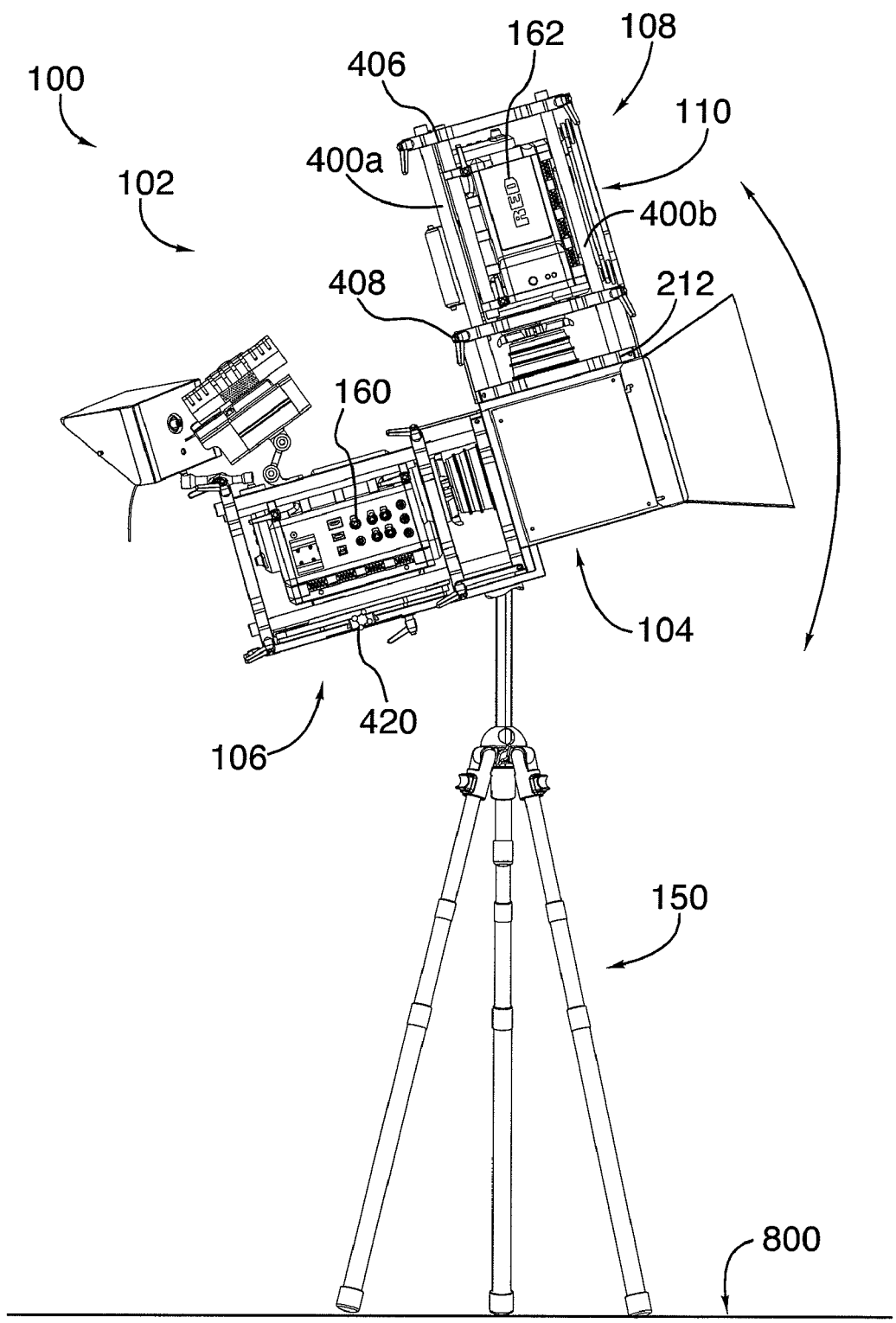
FIG. 8 is a drawing showing a side elevation view of the stereoscopic camera rig shown in FIG. 1, to better show the pivotal movement of the frame structure relative to the stand.

Now referring to FIG. 8, there is shown the frame structure 102 mounted on the stand 150.

In the illustrated embodiment, the frame structure 102 is pivotally connected to the stand 150 to enable the frame structure 102 to be oriented towards the subject. The stand 150 may rest on a ground surface 800 or, alternatively, be mounted a vehicle, such as a camera dolly, which is movable relative to the ground surface 800.

A user may first mount the first and second cameras 160, 162 to the first and second camera supports 106, 108, respectively. Since the half-silvered mirror is secured securely mounted to the casing sidewall 200, the first and second cameras 160, 162 may be positioned relative to the half-silvered mirror. The first and second cameras 160, 162 may be set to a desired position by respectively using the first and second camera mounting members 420, 232 and by selectively moving the first and second rigid binding members 406, 408 towards and away from the casing 104. Once the first and the second cameras 160, 162 have been set to the desired position, the position of the first and second rigid binding members 406, 408 is locked relative to the four elongated frame members 400a, 400b, 400c, 400d.

When the frame structure 102 is pivoted, the first and second camera supports 106, 108 and the casing 104 move relative to the ground surface 800, but not to each other. Indeed, the attaching means 212 of the first and second camera supports 106, 108 maintain the first and second camera supports 106, 108 secured to the casing 104 and prevent the first and second camera supports 106, 108 from moving relatively thereto. The casing 104 is sufficiently rigid to properly support the first and second camera supports 106, 108, while the outer frame 110 of the first and second camera supports 106, 108 substantially prevents deformation of the first and second camera supports 106, 108 due to bending.

Furthermore, the outer frame 110 provides substantial protection from impact to the first and second cameras 160, 162. For instance, if the frame structure 102 is used to record images of an action sequence, the frame structure 102 may advantageously be positioned substantially close to the action without risking damage to the first and second cameras 160, 162, which are usually substantially costly.

It will further be appreciated that the frame structure 102 may be readily disassembled, which is of great advantage for transporting the frame structure 102, for instance to record images in different locations which provide different settings for a movie.

The frame structure 102, as described herein, may further be provided as a kit, in which the first camera support 106, the second camera support 108 and the casing 104 would all be provided as unassembled, discrete parts which would then be assembled by a person skilled in the art according to the description provided hereinabove.

Although the above description relates to a specific preferred embodiment as presently contemplated by the inventor, it will be understood that the invention in its broad aspect includes mechanical and functional equivalents of the elements described herein.

The invention claimed is:

1. A frame structure for stereoscopic imaging, the frame structure comprising:
   a casing having a casing sidewall and first and second openings defined on the casing sidewall, the casing being sized and shaped to receive a beam splitting device therein for directing a first portion of an incoming light beam towards the first opening and a second portion of the incoming light beam towards the second opening;
   a first camera support for holding a first camera and a second camera support for holding a second camera, each of the first and second camera supports comprising an outer frame defining an internal cavity for receiving a corresponding camera therein,
   attaching means for connecting the outer frame to the casing sidewall such that the corresponding camera is pointing towards a corresponding one of the first and second openings, the attaching means comprising at least three connecting portions contacting the casing sidewall and positioned around the corresponding opening.

2. The frame structure as claimed in claim 1, wherein the at least three connecting portions are interconnected to form a mounting base fastened to the casing sidewall.

3. The frame structure as claimed in claim 2, wherein the mounting base comprises a peripheral frame member having a plurality of elongated side members positioned around the corresponding opening, each elongated side member being connected to an adjacent elongated side member to define a corner portion of the peripheral frame member therebetween.

4. The frame structure as claimed in claim 3, wherein the peripheral frame member is rectangular and the plurality of elongated side members comprises four elongated side members.

5. The frame structure as claimed in claim 3, wherein the outer frame comprises a plurality of elongated members having a first end and a second end located away from the casing, the plurality of elongated members being parallel to each other and spaced apart to define the cavity therebetween, further wherein each corner portion of the peripheral frame member has an opening defined therein for receiving the first end of a corresponding elongated member therein.

6. The frame structure as claimed in claim 2, wherein the mounting base is removably connected to the casing using fastening means selected from a group consisting of bolts, screws, rivets and clamps.

7. The frame structure as claimed in claim 1, wherein the casing sidewall comprises a first planar portion defining a first plane and a second planar portion defining a second plane perpendicular to the first plane; further wherein the first opening is defined in the first planar portion and the second opening is defined in the second planar portion.

8. The frame structure as claimed in claim 7 further comprising a half-silvered mirror extending on a third plane angled away from the first plane and towards the second plane at a predetermined angle.

9. The frame structure as claimed in claim 8, wherein the predetermined angle is a 45 degree angle.

10. The frame structure as claimed in claim 8, wherein the casing further comprises mounting means for securely mounting the half-silvered mirror to the interior of the casing sidewall.

11. The frame structure as claimed in claim 10, wherein the half-silvered mirror has a first mirror end and a second mirror end located opposite the first end, further wherein the mounting means comprise a first frame member for securing the first mirror end thereto and a second frame member for securing the second mirror end thereto, each frame member having:
   first and second adjacent sides defining a first corner,
   second and third adjacent sides defining a second corner located opposite the first corner, and
   an oblique member extending between the first and second corners, the oblique member being adapted for fastening a corresponding end of the half-silvered mirror thereto.

12. The frame structure as claimed in claim 8, wherein the casing is rectangular and the casing sidewall comprises:

a top wall and a bottom wall spaced from the top wall and parallel thereto, the second opening being defined in the top wall;

a back wall extending between the top and bottom walls and perpendicular thereto, the first opening being defined in the back wall;

a first lateral wall and a second lateral wall spaced from the first lateral wall and parallel thereto, the first and second lateral walls being perpendicular to the top, bottom and back walls, the half-silvered mirror extending between the first and second lateral walls and being securely mounted thereto.

13. The frame structure as claimed in claim 7, wherein the first and second planar portions are rigidly interconnected and are manufactured from a rigid material selected from a group consisting of aluminum, steel, wood and polyvinyl chloride.

14. The frame structure as claimed in claim 1, wherein the outer frame comprises a plurality of elongated members parallel to each other and spaced apart to define the cavity therebetween.

15. The frame structure as claimed in claim 14, wherein the plurality of elongated members comprises four elongated members extending away from the casing and forming a generally rectangular pattern.

16. The frame structure as claimed in claim 14, wherein the outer frame further comprises at least one rigid binding member extending peripherally relative to the cavity, the rigid binding member holding the plurality of elongated frame members for maintaining the configuration of the outer frame.

17. The frame structure as claimed in claim 16, wherein the at least one rigid binding member comprises a first rigid binding member, a second rigid binding member spaced from the first rigid binding member and a camera mounting member extending between the first and second rigid binding members for mounting the corresponding camera thereto.

18. The frame structure as claimed in claim 17, wherein the first and second rigid binding members are slidably connected to the elongated members to enable selective movement of the camera mounting member and of the corresponding camera mounted thereto towards and away from the casing.

19. The frame structure as claimed in claim 18, wherein the rigid binding member comprises a polygonal frame having a plurality of corners, each corner having an opening defined therein adapted for slidably receiving a respective one of the elongated members therein.

20. A kit for a frame structure for use in stereoscopic imaging, the kit comprising:

a casing having a casing sidewall and first and second openings defined on the casing sidewall, the casing being sized and shaped to receive a beam splitting device therein for directing a first portion of an incoming light beam towards the first opening and a second portion of the incoming light beam towards the second opening;

a first camera support for holding a first camera and a second camera support for holding a second camera, each of the first and second camera supports comprising an outer frame defining an internal cavity for receiving a corresponding camera therein, attaching means for connecting the outer frame to the casing sidewall such that the corresponding camera is pointing towards a corresponding one of the first and second openings, the attaching means comprising at least three connecting portions for contacting the casing sidewall and for positioning around the corresponding opening.

\* \* \* \* \*